US011361389B1

(12) United States Patent
Gambale et al.

(10) Patent No.: US 11,361,389 B1
(45) Date of Patent: *Jun. 14, 2022

(54) ADAPTIVE LIFE ADVISOR SYSTEM

(71) Applicant: Wells Fargo Bank, N.A., San Francisco, CA (US)

(72) Inventors: Nick Gambale, San Francisco, CA (US); Ashish B. Kurani, Hillsborough, CA (US); Kayla Palm, San Francisco, CA (US); Dana Roytenberg, San Francisco, CA (US); Eric Vanderleek, High Ridge, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,089

(22) Filed: Mar. 25, 2021

Related U.S. Application Data

(63) Continuation of application No. 15/913,584, filed on Mar. 6, 2018, now Pat. No. 10,963,972.

(51) Int. Cl.
| G06Q 40/00 | (2012.01) |
| G06N 5/02 | (2006.01) |
| H04N 7/15 | (2006.01) |
| H04L 51/04 | (2022.01) |
| G06F 16/951 | (2019.01) |

(52) U.S. Cl.
CPC .......... *G06Q 40/12* (2013.12); *G06F 16/951* (2019.01); *G06N 5/022* (2013.01); *H04L 51/04* (2013.01); *H04N 7/15* (2013.01)

(58) Field of Classification Search
None
See application file for complete search history.

(56) References Cited

U.S. PATENT DOCUMENTS

| 5,392,382 | A | * | 2/1995 | Schoppers | ............. | G06N 5/003 |
| | | | | | | 706/62 |
| 5,544,282 | A | * | 8/1996 | Chen | ...................... | B25J 9/1666 |
| | | | | | | 700/255 |
| 9,443,192 | B1 | * | 9/2016 | Cosic | ...................... | G06N 5/048 |
| 10,331,336 | B2 | * | 6/2019 | Chaudhri | ................ | H04L 51/04 |
| 10,484,541 | B2 | * | 11/2019 | Kannan | ............... | H04M 3/5183 |
| 10,489,388 | B1 | * | 11/2019 | Rogynskyy | .......... | G06F 16/2379 |
| 2006/0184511 | A1 | * | 8/2006 | Koo | ........................ | G06Q 10/10 |
| 2007/0150330 | A1 | * | 6/2007 | McGoveran | ....... | G06Q 30/0201 |
| | | | | | | 705/7.29 |

(Continued)

*Primary Examiner* — Fateh M Obaid
(74) *Attorney, Agent, or Firm* — Foley & Lardner LLP

(57) ABSTRACT

Examples described herein relate to apparatuses and methods for providing automated advising services to a customer of a provider institution, including but not limited to a provider institution computing system determining a goal of the customer based on a user input of the customer, generating a set of sub-goals for the goal, determining a current status of the customer relating to the sub-goals and the goal, determining whether the current status of the customer meets any sub-goals and a projected status of the customer indicating whether the customer is projected to meet the goal, and sending a notification to a user device of the customer notifying the customer of a completion state of the goal based on at least one of the sub-goals met by the current status of the customer and whether the customer is projected to meet the goal.

20 Claims, 6 Drawing Sheets

(56) References Cited

U.S. PATENT DOCUMENTS

| | | | |
|---|---|---|---|
| 2007/0288439 A1* | 12/2007 | Rappaport | G06F 16/9535 |
| 2008/0114651 A1* | 5/2008 | Jain | G06Q 30/0226 |
| | | | 705/14.26 |
| 2008/0140491 A1* | 6/2008 | Jain | G06Q 30/0212 |
| | | | 705/14.47 |
| 2008/0288595 A1* | 11/2008 | Liu | G06Q 10/10 |
| | | | 709/206 |
| 2010/0023459 A1* | 1/2010 | Sundby | G06Q 40/06 |
| | | | 705/36 R |
| 2010/0095269 A1 | 4/2010 | Bouillet et al. | |
| 2011/0013557 A1 | 1/2011 | Westberg et al. | |
| 2011/0093418 A1* | 4/2011 | Kwok | G06N 3/008 |
| | | | 706/12 |
| 2011/0131557 A1* | 6/2011 | Bouillet | G06F 9/541 |
| | | | 717/138 |
| 2013/0124189 A1 | 5/2013 | Baldwin | |
| 2014/0067634 A1* | 3/2014 | Sowder | G06Q 40/06 |
| | | | 705/35 |
| 2014/0101088 A1 | 4/2014 | Hall et al. | |
| 2014/0122391 A1* | 5/2014 | Mugan | G06N 5/025 |
| | | | 706/12 |
| 2015/0154256 A1* | 6/2015 | McKenna | G06F 16/24542 |
| | | | 707/718 |
| 2017/0277863 A1* | 9/2017 | Subra | G09B 19/0092 |
| 2017/0287038 A1* | 10/2017 | Krasadakis | G06Q 30/0201 |
| 2018/0152884 A1* | 5/2018 | Hu | H04W 8/18 |
| 2019/0057449 A1* | 2/2019 | Berd | G06Q 40/04 |
| 2019/0114925 A1* | 4/2019 | Schulman | G05D 1/106 |
| 2019/0156821 A1* | 5/2019 | Zamora Duran | G10L 15/24 |
| 2021/0232760 A1* | 7/2021 | Munro | G06F 16/35 |

* cited by examiner

ADAPTIVE LIFE ADVISOR SYSTEM

CROSS-REFERENCE TO RELATED APPLICATIONS

The present application is a continuation of U.S. application Ser. No. 15/913,584, filed Mar. 6, 2018, the contents of which are incorporated herein by reference.

BACKGROUND

Customers of a provider institution, and especially the emerging affluent, need to plan and manage risk to grow their wealth. Traditionally, provider institutions are not knowledgeable of their customers' financial and life statuses and their customers' goals to provide appropriate advice. Furthermore, consulting with a human advisor is undesirable or unpractical for many customers for many reasons, including the expense and inconvenience of such consultations.

SUMMARY

In one arrangement, a method includes determining, by a provider computing system of a provider institution, a goal of a customer of the provider institution based at least in part on a user input of the customer. The provider computing system generates a set of sub-goals for the goal of the customer. The sub-goals define steps required to be met by the customer to reach the goal. The provider computing system determines a current status of the customer relating to the sub-goals and the goal, where the current status of the customer is based on an amount of funds held by the customer in an account. The provider computing system determines whether the current status of the customer meets any sub-goals and a projected status of the customer indicating whether the customer is projected to meet the goal. The provider computing system sends a notification to a user device of the customer notifying the customer of a completion state of the goal based on at least one of the sub-goals met by the current status of the customer and whether the customer is projected to meet the goal.

In one arrangement, a provider computing system configured to provide automated advising services for a customer of a provider institution includes a processing circuit having a processor and a memory, where the processing circuit implements an adviser Artificial Intelligence (AI) circuit configured to determine a goal of a customer of the provider institution based at least in part on a user input of the customer. The adviser AI circuit further generates a set of sub-goals for the goal of the customer, the sub-goals defining steps required to be met by the customer to reach the goal. The adviser AI circuit further determines a current status of the customer relating to the sub-goals and the goal, where the current status of the customer is based on an amount of funds held by the customer in an account. The adviser AI circuit further determines whether the current status of the customer meets any sub-goals and a projected status of the customer indicating whether the customer is projected to meet the goal. The adviser AI circuit sends a notification to a user device of the customer notifying the customer of a completion state of the goal based on at least one of the sub-goals met by the current status of the customer and whether the customer is projected to meet the goal.

In one arrangement, a non-transitory computer-readable medium having processor-readable instructions stored thereon such that, when executed by a processor, the instructions cause the processor to determine a goal of a customer of a provider institution based at least in part on a user input of the customer. The instructions further cause the processor to generate a set of sub-goals for the goal of the customer. The sub-goals define steps required to be met by the customer to reach the goal. The instructions further cause the processor to determine a current status of the customer relating to the sub-goals and the goal, where the current status of the customer is based on an amount of funds held by the customer in an account. The instructions further cause the processor to determine whether the current status of the customer meets any sub-goals and a projected status of the customer indicating whether the customer is projected to meet the goal. The instructions further cause the processor to send a notification to a user device of the customer notifying the customer of a completion state of the goal based on at least one of the sub-goals met by the current status of the customer and whether the customer is projected to meet the goal.

These and other features, together with the organization and manner of operation thereof, will become apparent from the following detailed description when taken in conjunction with the accompanying drawings.

DETAILED DESCRIPTION

Figure 1:
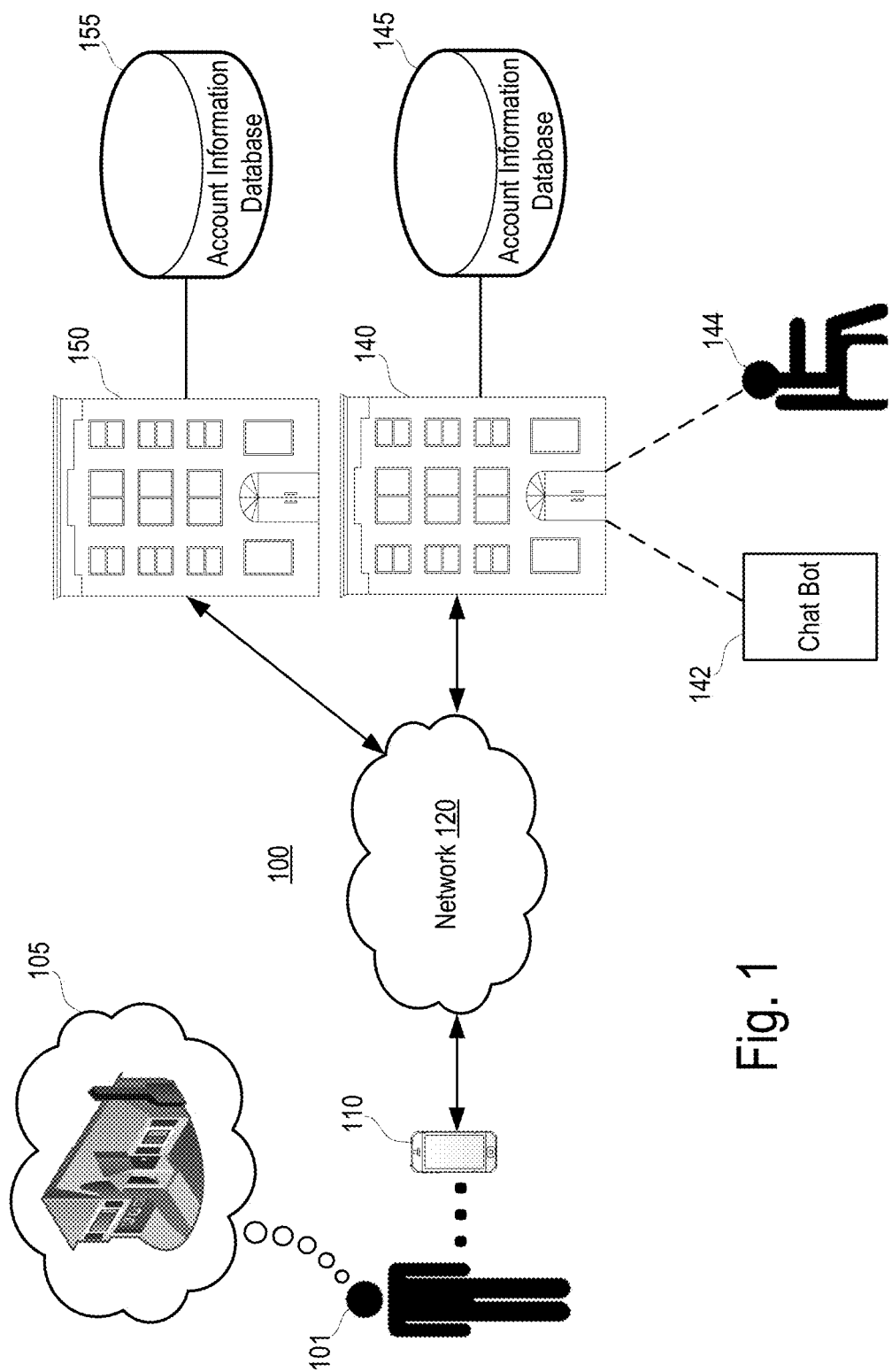
FIG. 1 is a diagram of a system for providing automated advising services according to some arrangements.

Arrangements described herein relate to systems, apparatuses, and methods for implementing Artificial Intelligence (AI) to identify and clarify a customer's goals, determine a projected status of the customer, assist the customer in making informed decisions that best conform to their goals, and dynamically gathering information about the customer for recommending subsequent activities. The AI system accounts for changes of goals and/or statuses of the customer over time to dynamically and adaptively guide the customer with up-to-date advice. Herein, "automatic" is defined as pertaining to an electronically carried out action that does not require outside (either human or machine) intervention to be scheduled, triggered, executed, and/or completed.

Wealth management and planning are the hallmarks of fiscal responsibility and are of paramount importance. Currently, the emerging affluent desires automated and interactive computerized systems to provide day-to-day assistance with wealth management and planning. The emerging affluent (especially millennials) have seen and will see a tremendous amount of rapid changes due to disruptive technology. In the context of the rapidly changing world, an AI system for providing fast-paced, up-to-date, and accurate advice can provide scalable day-to-day counseling.

Meeting with a human advisor can be expensive and inconvenient to do frequently, especially for the career-oriented emerging affluent. On the other hand, digital alerts, notifications, and recommendations can be pushed by the AI system to a mobile smart device operated by the customer to provide real-time advice. The AI system as described herein can thus bridge the gap between visits to a human advisor to assure that the customer is on-track to achieve his or her goals without the hassle of using a human advisor.

In general, the arrangements of the AI system described herein automate counseling that has not been previously automated. Traditionally, between visits to human advisers, customers themselves estimate their own statuses to determine whether they are on-track to achieve their goals. Each customer simply does not have sufficient analytical resources to accurately determine his or her status within a reasonable timeframe due to the large amount of information involved. The AI system described herein can learn a customer's goals and account information and then automatically alert or otherwise assist the customer to reach their goals. The systems and methods disclosed herein can be adapted to monitor the customer's account information, including account balances and all transactions made by the customer.

In some arrangements, the AI system can function as a gatekeeper to filter out customers who are on-track or almost on-track to fulfill their goals while identifying other customers who may need professional advice from a human or a chat bot. The AI system can automatically facilitate communications between a customer and a human adviser or between the customer and a chat bot. Such an AI-based solution promotes day-to-day planning. The AI system as described herein therefore can act as a first line of defense for improving the status, financially or otherwise, of the emerging affluent.

In particular, the AI system can be a virtual counselor that is knowledgeable about a customer's goals and is connected to suitable databases that store account information of the customer. The AI system can determine a projected status of the customer using the account information. Future impacts of actual or pending decisions by the customer are predicted and compared to the goal. In some examples, notifications and alerts can be sent to the customer's device responsive to determining that the customer's decisions are hindering the goal. In some examples, communication with a human adviser or a chat bot can be automatically initiated responsive to determining that the customer is veering off-track. Accordingly, the AI system combines both bot-type automated counseling and human counseling into a single system.

The arrangements of the AI system described herein improve computer-related technology by performing certain steps that cannot be done by conventional advising systems or human actors. For example, the AI system is configured to determine a projected status of a customer using context information and account information. Accurate and realistic predictions of future status are facilitated by generating and fathering the context information and the account information. In some arrangements, to achieve benefits over conventional systems having databases, table, and field definitions that are static, the databases described herein may be data-type agnostic and configured to store different information for different users, transaction types, etc. Furthermore, to achieve benefits over conventional databases and to solve a technical problem of improving dimensional scalability (such that different aspects of transactions may be analyzed for different users on the same data storage infrastructure as the autonomous bill pay bot learns the relevant aspects through pattern mining), and faster advising services by reducing computer processing times for analyzing loan needs and qualifications of users receiving such services, the data stored in multidimensional form may be aggregated and/or stored using improved methods. For example, the status of customers may be dynamically calculated after being stored when the data is retrieved for analysis and/or transaction processing.

In an example arrangement, the AI system includes a particular and unique set of rules, which are set up to account for and learn from account activities and to produce an accurate prediction of a customer's status that traditionally would have required human intervention. Additionally, another particular and unique set of rules define automated transaction processing, notifications, rewards, electronic communications, and the like which traditionally would have required an evaluation by a human being. Further, arrangements described herein solve the internet-centric problem of automating advising services and providing these services in a convenient manner (e.g., via a mobile device of a customer using push notifications, messages, or other alerts).

In addition, arrangements described herein solve the technical problem of determining the appearance and functionality of an electronic user interface providing real time alerts of a customer's status. In some arrangements, alerts can be displayed with a single click.

FIG. 1 is a diagram of an example of a system 100 for providing automated advising services according to some arrangements. Referring to FIG. 1, a customer 101 is a customer or potential customer of a provider institution 140. The customer 101 can be any entity (e.g., an individual, a company, or the like). In some examples, the provider institution 140 is a financial institution. In some arrangements, the customer 101 is a customer or potential customer of one or more other provider institutions (e.g., a provider institution 150). One or both of the provider institutions 140 and 150 can store account information of the customer 101, for example, in respective account information databases 145 and 155. In some arrangements, each of the account information databases 145 and 155 is a financial information database. The provider institutions 140 and 150 can collect and store the account information in the course of dealing (e.g., processing transactions, offering products/services, and the like) with the customer 101. While the provider institutions 140 and 150 are depicted as brick and mortar locations in FIG. 1, one of ordinary skill in the art can appreciate that one or more of the provider institutions 140 and 150 may not be associated with brick and mortar locations.

As used herein, "account information" of the customer 101 includes information about assets, liabilities, and activities of the customer 101. Examples of types of account information include but are not limited to, account types (e.g., saving, credit, checking, investment, retirement, mortgage, rewards, and the like), account balances, account activities, transaction history, auto-pay preferences, income, debt, saving, mortgage, and the like. Given that the customer 101 can hold accounts in more than one provider institution, the account information of the customer 101 may be stored in two or more databases (e.g., the account information databases 145 and 155) managed by two or more provider institutions (e.g., the provider institutions 140 and 150). While two provider institutions 140 and 150 are shown for illustrative purposes, one of ordinary skill in the art can appreciate that the entirety of the account information of the customer 101 can be spread across and stored with one, or three or more provider institutions.

The customer 101 has one or more goals, represented in FIG. 1 as a goal 105. While the goal 105 is presented as owning/buying a home in FIG. 1, one of ordinary skill in the art can appreciate that the goal 105 can be any suitable goal(s). As used herein, the goal 105 of the customer 101 refers to a future status reflective of a need or desire of the customer 101. The goal 105 is typically associated with a capability for the customer 101 to purchase goods and services in the future. In some arrangements, the customer 101 can explicitly state the goal 105 via an input device (e.g., an input circuit 210 shown in FIG. 2A) of a user device 110, in the manner described herein. In other arrangements, a provider institution computing system (e.g., the provider institution computing system 230 of FIG. 2B) can determine the goal 105 based on the account information of the customer 101 in the manner described. The goal 105 can change over time.

In some arrangements, the goal 105 explicitly states a future monetary value and a desired realization time. For example, the goal 105 can be accumulating an asset (e.g., an investment account) with a specified worth (e.g., $500,000 in balance) within a particular timeframe (e.g., in five years).

In some arrangements, the goal 105 is defined by a desired transaction to occur at a desired realization time, where a future monetary value for the transaction is not explicitly stated. In one example, the goal 105 can be purchasing a home in Los Angeles in ten years. In another example, the goal 105 can be taking a vacation in Europe in nine months. In such examples, a future monetary value associated with the goal 105 can be determined based on context information related to the goal 105.

As used herein, "context information" refers to data associated with the goal 105 and includes data based on which a future monetary value of the goal 105 can be calculated, if the future monetary value of the goal 105 is not explicitly stated. Examples of the context information include but are not limited to, interest rates, market fluctuation, consumer price index, stock market information, location information (e.g., local housing market prices, school district information, local price indexes, and the like), and the like. In particular, the context information can be projected and extrapolated for a stated timeframe (the desired realization time) associated with the goal 105 to determine the future monetary value associated with the goal 105, based on suitable predictive models. Different types of models (e.g., housing market models and stock market models) can be implemented for different types of goals (e.g., buying a home and investing in the stock market, respectively).

The customer 101 operates the user device 110. The user device 110 is connected to the provider institution 140 (e.g., the provider institution computing system 230 of FIG. 2B) via a communication network 120 to access goods and services provided by the provider institution 140. In some arrangements, the user device 110 is further connected to the provider institution 150 (e.g., a provider institution computing system similar to that shown in FIG. 2B) via the communication network 120 to access products and services provided by the provider institution 150.

The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combinations thereof, and/or the like. The communication network 120 is structured to permit the exchange of data, values, instructions, messages, and the like among the user device 110, the provider institution 140, and the provider institution 150.

The provider institution 140 can employ a chat bot 142 for assisting the customer 101 with decisions. The chat bot 142 is an AI system configured to receive user input corresponding to an inquiry from the customer 101, analyze the user input as well as the goal 105, the context information associated with the goal 105, the account information of the customer 101, and the like to render virtual advice to the customer 101.

The provider institution 140 can employ a human adviser 144 capable of providing advice to the customer 101. The human adviser 144 can further offer products and services to the customer 101.

Figure 2:
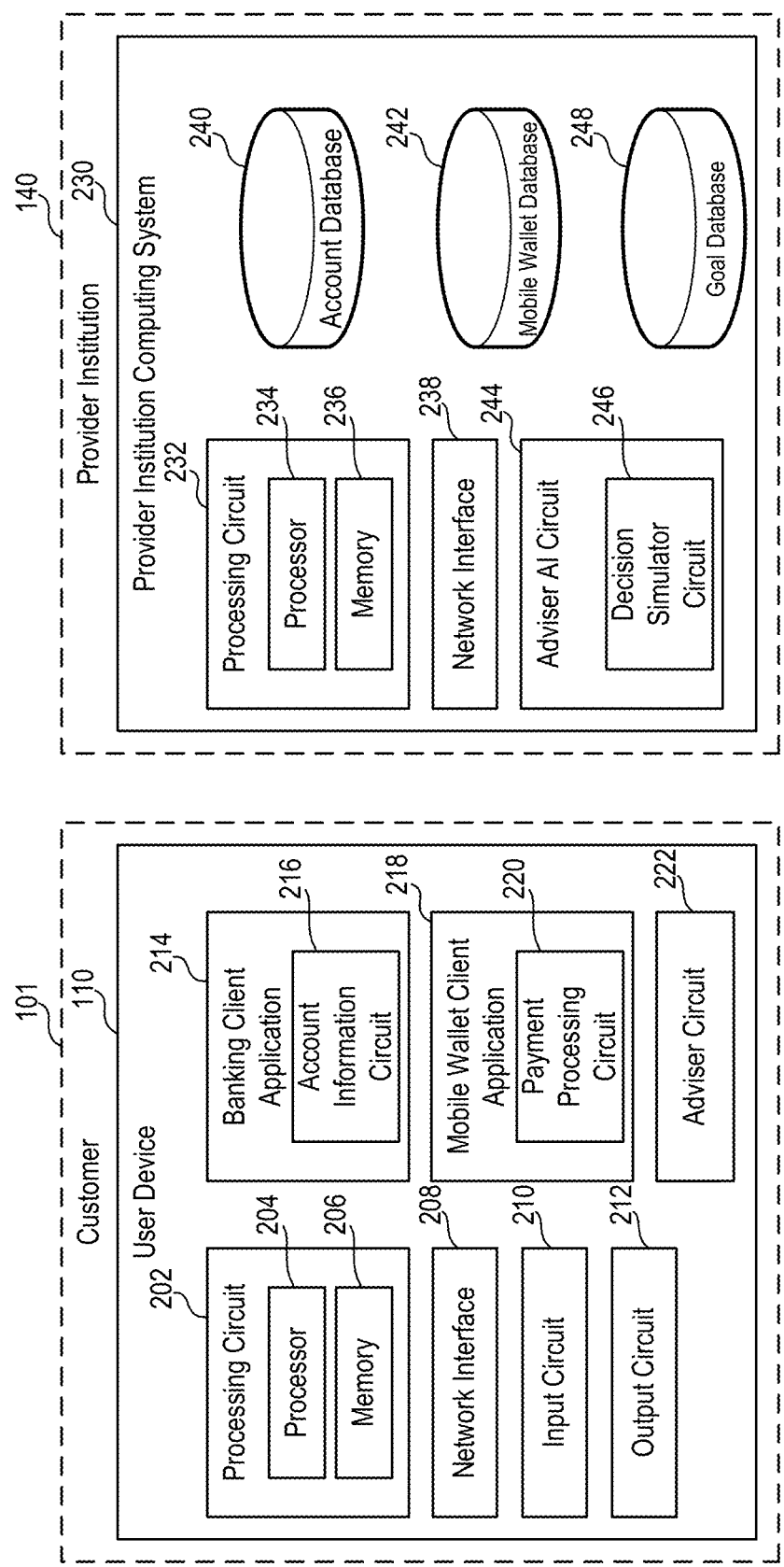
FIG. 2A is a diagram of a user device of the system shown in FIG. 1 according to some arrangements.
FIG. 2B is a diagram of a provider computing system according to some arrangements.

FIG. 2A is a diagram of an example of the user device 110 of the system 100 set forth in FIG. 1 according to some arrangements. FIG. 2B is a diagram of an example of the provider institution computing system 230 according to some arrangements. Referring to FIGS. 1-2B, the provider institution 140 includes one or more of a bank branch, loan office, mortgage office, services office, retail office, automated teller machine (ATM) location, a combination thereof, and/or the like. The provider institution 140 has at least one associated provider institution computing system 230. In some examples, the provider institution computing system 230 is a financial institution computing system.

The provider institution 140 provides products and services such as, but not limited to, credit card accounts, mobile wallet, checking/saving accounts, retirement accounts, mortgage accounts, loan accounts, investment and accounts, and the like to the customer 101 via the provider institution computing system 230.

The provider institution computing system 230 includes a processing circuit 232 composed of a processor 234 and a memory device 236. The processor 234 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 236 can be implemented with a Random Access Memory (RAM), Read-Only Memory (ROM), Non-volatile RAM (NVRAM), Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores programming logic that, when executed by the processor 234, controls the operations of the provider institution computing system 230. In some arrangements, the processor 234 and the memory 236 form various processing circuits in the provider institution computing system 230.

As shown, the provider institution computing system 230 includes a network interface 238. The network interface 238 is structured for sending and receiving data over the communication network 120 (e.g., to and from the user device 110, another provider institution computing system associated with the provider institution 150, and the like). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The provider institution computing system 230 includes an account database 240 that stores customer information and account information relating to one or more accounts held by the customer 101 with the provider institution 140. In this regard, more than one provider institution (such as, but not limited to, the provider institutions 140 and 150) with an associated provider institution computing system (such as, but not limited to, the provider institution computing system 230) can be communicably coupled to the components of FIG. 2 over the communication network 120 to access the accounts held by the customer 101, and vice versa. The account database 240 stores transaction history of transactions made by the customer 101 using one or more accounts of the customer 101, for example, with a banking client application 214, a mobile wallet client application 218, or with other suitable applications.

The provider institution computing system 230 includes a mobile wallet account database 242 for storing mobile wallet accounts of customers, including the customer 101. The mobile wallet accounts permit payments via the mobile wallet client application 218 of the user device 110. The mobile wallet account database 242 stores transaction history of transactions made by the customer 101 using the mobile wallet client application 218.

The account information database 145 of the provider institution 140 includes the account database 240, the mobile wallet database 242, and other databases that store the account information of the customer 101. Similarly, the account information database 155 of the provider institution 150 can include a similar account database, a mobile wallet database, and other databases that store the account information of the customer 101.

The provider institution computing system 230 includes an adviser AI circuit 244. The adviser AI circuit 244 is capable of identifying and clarifying the goal 105 of the customer 101 in the manner described. In addition, the adviser AI circuit 244 gathers the account information of the customer 101 locally from the account information database 145, the account database 240, the mobile wallet database 242, and other databases managed by or coupled to the provider institution computing system 230. For example, the adviser AI circuit 244 is coupled to one or more of the account database 240 and the mobile wallet database 242 to access (e.g., query) the account information stored thereon. The adviser AI circuit 244 can also gather the account information of the customer 101 from other provider institutions (e.g., the provider institution 150). For instance, the adviser AI circuit 244 can query the remote account information database 155 for the account information of the customer 101 with suitable Application Programming Interfaces (APIs). The adviser AI circuit 244 can further determine a projected status of the customer 101 and determine whether the projected status of the customer 101 is on-track to achieve the goal 105. The adviser AI circuit 244 is operatively coupled to one or more of the components of the provider institution computing system 230. For example, the adviser AI circuit 244 is coupled to the network interface 238 for communicating with one or more of the user device 110 and a provider institution computing system of the provider institution 150 via the communication network 120.

The adviser AI circuit 244 includes an AI decision simulator circuit 246 that simulates and projects future effects of decisions of the customer 101. In particular, the AI decision simulator circuit 246 can query one or more of the account database 240, mobile wallet database 242, the account information database 145, the account information database 155, and another suitable database for account information of the customer 101. The AI decision simulator circuit 246 queries transaction history of the customer 101 to determine future effects of one or more of completed or pending transactions on the health of the customer 101. The simulation, prediction, and projection can be based on suitable models that consider the context information, the account information of the customer 101, and the desired realization time associated with the goal 105.

In some examples, the adviser AI circuit 244 is implemented with the processing circuit 232. For example, the adviser AI circuit 244 can be implemented as a software application stored within the memory 236 and executed by the processor 234. Accordingly, such examples can be implemented with minimal or no additional hardware costs. However, other implementations rely on dedicated hardware specifically configured for performing operations of the adviser AI circuit 244.

The provider institution computing system 230 includes a goal database 248 for storing goals (such as but not limited to, the goal 105) of the customers (such as but not limited to, the customer 101). Upon receiving user-defined goals from the user device 110 or upon determining automatically defined goals, the adviser AI circuit 244 relays the goals to the goal database 248 to be indexed and stored.

As shown, the customer 101 operates or is associated with the user device 110. In some arrangements, the user device 110 includes a processing circuit 202 having a processor 204 and memory 206. The processor 204 can be implemented with a general-purpose processor, an ASIC, one or more FPGAs, a DSP, a group of processing components that are distributed over various geographic locations or housed in a single location or device, or other suitable electronic processing components. The memory 206 can be implemented with RAM, NVRAM, ROM, Flash Memory, hard disk storage, and other suitable electronic storage components. The memory 206 stores data and/or computer code for facilitating the various processes described herein. Moreover, the memory 206 is or includes tangible, non-transient volatile memory or non-volatile memory. Accordingly, the memory 206 includes database components, object code components, script components, or any other type of information structure for supporting the various activities and information structures described herein.

The user device 110 is shown to include various circuits and logic for implementing the activities described herein. More particularly, the user device 110 includes one or more of the processing circuit 202, network interface 208, input circuit 210, output circuit 212, the banking client application 214, the mobile wallet client application 218, the adviser circuit 222, and the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included.

The network interface 208 is configured for and structured to establish a communication session via the communication network 120 with the provider institution computing system 230. Accordingly, the network interface 208 is an interface such as, but not limited to, the network interface 238.

The input circuit 210 is configured to receive user input the customer 101. The output circuit 212 is configured to output information in the form of graphics, sound, tactile feedback (e.g., vibrations), and the like. In this regard, the input circuit 210 and the output circuit 212 are structured to exchange data, communications, instructions, etc. with an input/output component of the user device 110. Accordingly, in some arrangements, the input circuit 210 and the output circuit 212 can be combined into an input/output circuit that includes or is coupled to an input/output device such as but not limited to, a display device, touchscreen, keyboard, microphone, and/or the like. In some arrangements, the input/output circuit includes communication circuitry for facilitating the exchange of data, values, messages, and the like between the input/output device and the components of the user device 110. In some arrangements, the input circuit 210 and the output circuit 212 include machine-readable media for facilitating the exchange of information between the input/output device and the components of the user device 110. In still another arrangement, the input circuit 210 and the output circuit 212 include any combination of hardware components (e.g., a touchscreen), communication circuitry, and machine-readable media.

One or more of the banking client application 214 and mobile wallet client application 218 are server-based applications executable on the user device 110. In this regard, the customer 101 first downloads the application(s) prior to usage. In another arrangement, the banking client application 214 and/or mobile wallet client application 218 are coded into the memory 206 of the user device 110. In still another arrangement, the banking client application 214 and/or mobile wallet client application 218 are web-based interface applications. In this configuration, the customer 101 logs onto or otherwise accesses the web-based interface before usage. In this regard, at least one of the banking client application 214 and mobile wallet client application 218 is supported by a separate computing system comprising one or more servers, processors, network interface modules, etc. that transmit the applications for use to the user device 110. In certain arrangements, one or more of the banking client application 214 and/or mobile wallet client application 218 include an API and/or a Software Development Kit (SDK) that facilitate integration of other applications. All such variations and combinations are intended to fall within the spirit and scope of the present disclosure.

The banking client application 214 is communicably coupled to the provider institution computing system 230 (e.g., the account database 240) via the communication network 120 and is structured to permit management of at least one account of the customer 101 via the banking client application 214. In this regard, the banking client application 214 provides displays indicative of account information such as, but not limited to, current account balances, pending transactions, profile information (e.g., contact information), reward associated with the account, bill pay information and/or the like. Further, in some arrangements, the banking client application 214 is configured to process payments from the customer 101 to a designated recipient. For example, the banking client application 214 depicts a loan (e.g., mortgage) of the customer 101 and allows the customer 101 to pay the loan from an account (e.g., checking or savings). In some examples, a bill pay option is provided by the banking client application 214, where the bill pay option allows the customer 101 to pay his/her bills in response to user input.

As mentioned herein, via the banking client application 214, the customer 101 pays bills (e.g., mortgage), view balances, pays merchants, and otherwise manage accounts. Accordingly and as shown, the mobile bank client application 214 includes an account information circuit 216. The account information circuit 216 is linked or otherwise coupled to one or more accounts (as stored in the account database 240) held by the customer 101 and permit management of the associated accounts (e.g., transfer balances between accounts, view payment history) by communicating with the provider institution computing system 230. The banking client application 214 is communicably coupled to the mobile wallet client application 218. As such, in response to a mobile payment via the mobile wallet client application 218, the mobile wallet client application 218 causes the banking client application 214 to update the payment account (i.e., the account that supported the mobile payment). As such, the applications 214 and 218 are communicably coupled to each other to enable actions supported by each respective application.

The mobile wallet client application 218 is communicably coupled to the provider institution computing system 230 (e.g., the mobile wallet database 242) via the communication network 120 and is structured to facilitate purchases by the customer 101 via the mobile wallet client application 218. Accordingly, the mobile wallet client application 218 is linked or otherwise connected with one or more accounts (as stored in the account database 240) of the customer 101. In operation, when at a point-of-sale terminal, the customer 101 initiates the mobile wallet client application 218 and provides a passcode (e.g., biometrics such as a thumbprint, a Personal Identification Number (PIN), a password) to authenticate the customer 101 and select the source payment account desired (e.g., a checking account from the provider institution 140 that is linked to the mobile wallet client application 218). Via communication with the payment terminal (e.g., via near field communication), the aforementioned payment information is provided to the POS terminal or the merchant (e.g., via NFC, via barcode presentment) and the payment is processed. Beneficially, carrying payment cards are avoided or reduced via the mobile wallet client application 218.

As mentioned herein, the mobile wallet client application 218 is structured to facilitate and permit payments by interfacing with an account held by the customer 101 at the provider institution 140. Accordingly, the mobile wallet client application 218 is communicably coupled via the network interface 208 over the communication network 120 to the provider institution computing system 230. As shown, the mobile wallet client application 218 includes a payment processing circuit 220 structured to facilitate payments by the customer 101 via the mobile wallet client application 218. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 218 and a POS terminal.

In some arrangements, the user device 110 includes an adviser circuit 222. The adviser circuit 222 is operatively coupled to one or more of the components of the user device 110. For example, the adviser circuit 222 is coupled to the network interface 208 for communicating the user-defined goal 105 and related messages to the provider institution computing system 230 via the communication network 120. In some examples, the adviser circuit 222 is coupled to the output circuit 212 to output digital alerts, notifications, and recommendations that can be pushed by the adviser AI circuit 244.

Figure 3:
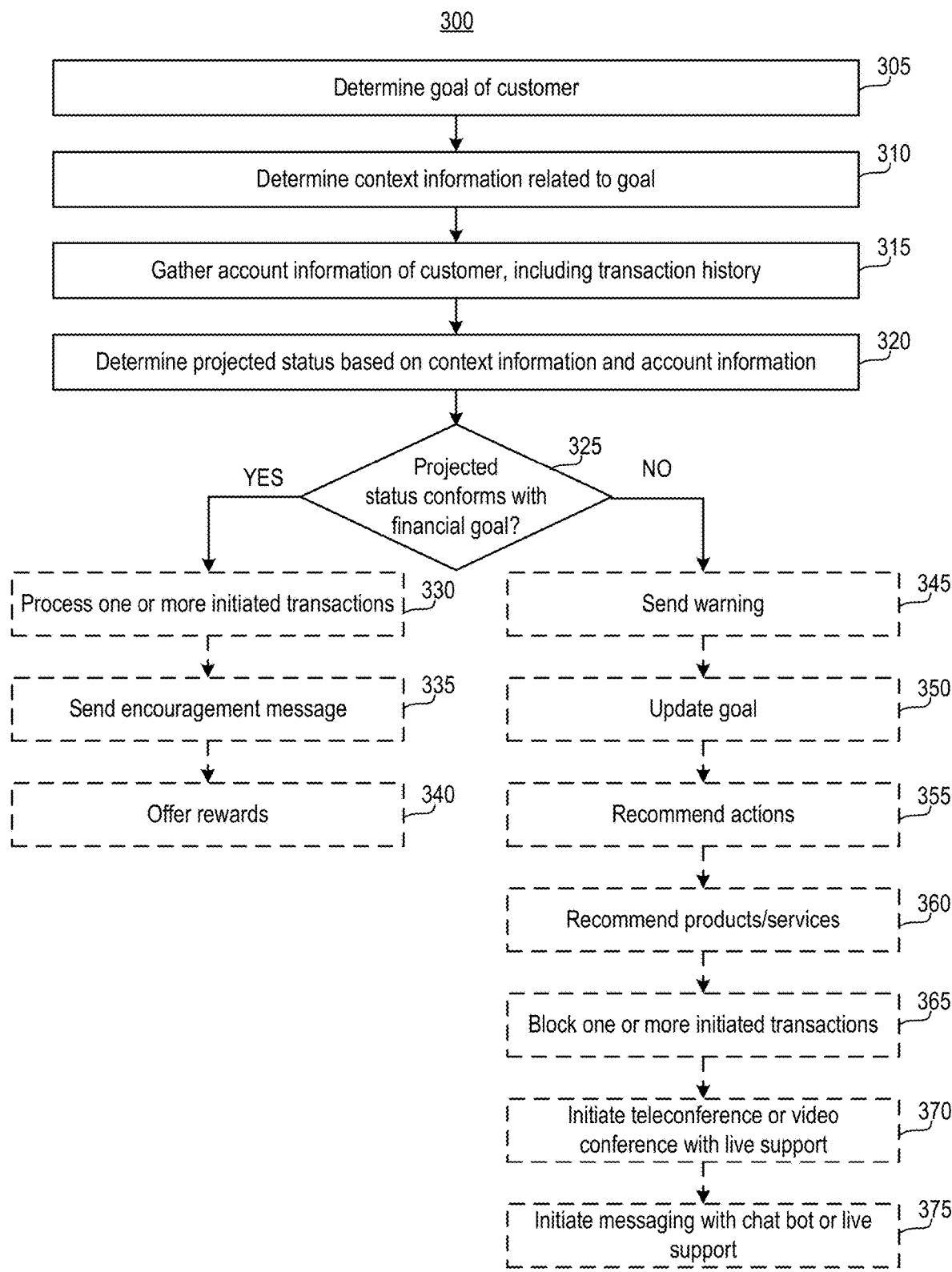
FIG. 3 is a flow diagram illustrating a method for providing automated advising services according to some arrangements.

FIG. 3 is a flow diagram illustrating a method 300 for providing automated advising services according to various arrangements. Referring to FIGS. 1-3, the adviser AI circuit 244 determines the goal 105 of the customer 101. The adviser AI circuit 244 gathers the context information and account information about the customer 101 and determines a projected status based on the context information and the account information. The adviser AI circuit 244 determines whether the projected status conforms with the goal 105, and interfaces with the user device 110 to provide recommendations of corrective actions.

At 305, the adviser AI circuit 244 determines the goal 105 of the customer 101. In some examples, the goal 105 can be explicitly defined by the customer 101. The customer 101 can define the goal 105 using the input circuit 210, in the course of signing up for products or services offered by the provider institution 140 or for the purposes of specifically defining the goal 105. For example, while inputting information when applying for a checking account, mortgage, or other products or services, the customer 101 can answer, via the input circuit 210, questions presented via the output circuit 212 related to the goal 105. The goal 105 can be defined at different times with respect to different products or services that may or may not be related to the goal 105. The adviser circuit 222 sends the input received via the input circuit 210 to the adviser AI circuit 244.

In some arrangements, the adviser AI circuit 244 can further determine a set of sub-goals for the goal 105 defined by the customer 101. In general, the set of sub-goals defines steps required to be met by the customer 101 to reach the goal 105. In some examples, the sub-goals define milestones achievable by the customer 101. The sub-goals may be distributed throughout a time interval, where the goal 105 is expected to be achieved at the end of the time interval. In other words, the end of the time interval corresponds to a desired realization time. The desired realization time can be received from the customer 101 via the input circuit 210 and sent to the adviser AI circuit 244.

In some arrangements, the sub-goals can be defined based on the realization time. In one example in which the goal 105 is to attain saving of a given amount (e.g., $1,000,000) at a given desired realization time (e.g., in 5 years), the sub-goals can include portions (e.g., portions of $200,000) of the given amount of every unit of time (e.g., every year) leading up to the desired realization time. Examples of the units of time include, but are not limited to, hours, days, weeks, months, and years. In some arrangements, in which the goal 105 is not associated with a particular monetary amount, the context information (determined at 310) as well as other information can be used to assign a monetary amount in the manner described. The sub-goals can then be determined based on the assigned monetary amount. Given that the context information can change over time, the sub-goals defined for the goal 105 may also change, even when there are no changes to the goal 105.

The adviser AI circuit 244, the processing circuit 232, or another suitable server processor can send various electronic forms for the customer 101 to fill using the input circuit 210. The electronic forms can be displayed on displays configured by a mobile application or a browser executed by the processing circuit 202, the banking client application 214, the mobile wallet client application 218, or the adviser circuit 222. The electronic forms can prompt the customer 101 to answer questions aimed to explicitly identify the goal 105.

For example, with respect to money management, the customer 101 can be asked to rank access, information, and protection in order of subjective priority. The customer 101 can be asked to disclose whether the customer 101 keeps track of account balances and transactions, the manner in which deposits are typically made, the manner in which bills are typically paid, the manner in which purchases are typically made, and information about automatic payments and automatic transfers. With respect to priorities, the customer 101 can be asked to rank saving, borrowing, home, insurance, investing, and retirement in order of subjective priority. With respect to credit card use, the customer 101 can be asked to disclose the manner in which one or more credit cards are used and subjective priorities (e.g., annual fees, cash back, reward points, interest rate, travel benefits, special features, and the like) when selecting a credit card. With respect to account protection, the customer 101 can be asked to disclose the manner in which accounts are managed to avoid overdrafts and declined debit card transactions and needs when traveling or sending money internationally. With respect to wealth growth, the customer 101 can be asked to identify goals, needs, desires, desired realization time associated therewith, the manner in which the customer 101 is currently saving, the amount that the customer 101 saves each month, and the confidence level that the customer 101 feels about his/her own saving plan. With respect to home and dwelling, the customer 101 can be asked to identify current and future home financing needs. With respect to insurance, the customer 101 can be asked to identify existing insurance on home, possession, health, and life. With respect to investments, the customer 101 can be asked to identify goals, desired realization time associated therewith, investment amounts, current investment account balances, and the confidence level in his or her investment plan. With respect to retirement, the customer 101 can be asked to disclose an expected time for retirement, current saving plan for retirement, date on which the customer 101 last reviewed retirement needs, and the confidence level in his or her retirement plan. Such examples are for illustrative purposes, and one of ordinary skill in the art can appreciate that other disclosures can be solicited for the purpose of identifying the goal 105.

Figure 4:
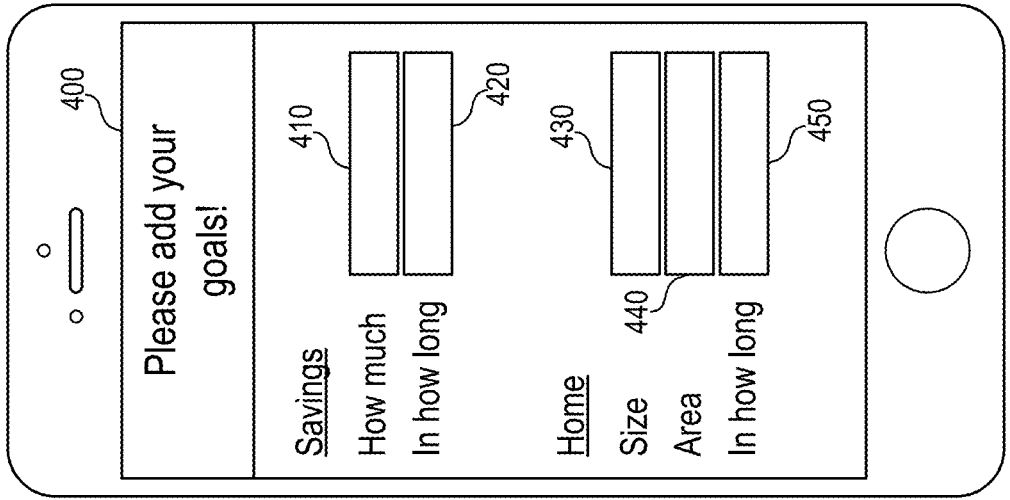
FIG. 4 is an interface display diagram illustrating an electronic form for receiving user input from a customer according to some arrangements.

FIG. 4 is interface display diagram illustrating an electronic form 400 to receive user input from the customer 101 (FIG. 1) relative to the goal 105 (FIG. 1) according to some arrangements. Referring to FIGS. 1-4, the electronic form 400 that is displayed by the output circuit 212 includes user interactive elements (e.g., input text fields 410-450) for receiving the user input. The input text fields 410-450 solicit answers concerning one or more of a future monetary value (e.g., input text field 410), a desired realization time (e.g., input text fields 420 and 450), and relevant information (e.g., input text fields 430 and 440) based on which a future monetary value and context information can be determined.

In some examples, the goal 105 can be defined by the adviser AI circuit 244 based on the account information about the customer 101. Based on the account information stored in one or more of the account database 240, the mobile wallet database 242, the account information database 145, the account information database 155, and the like, the adviser AI circuit 244 can identify life-events of the customer 101. The goal 105 can be automatically defined to correspond to the life-events. For instance, the adviser AI circuit 244 can scan transaction history stored in the databases and can detect that the customer 101 has begun purchasing baby supplies and paying for visits to an obstetrician-gynecologist. Based on this information, the adviser AI circuit 244 can determine that the customer 101 is expecting a child, which is a detected life-event. The adviser AI circuit 244 automatically sets the goal 105 to be one or more of purchasing a three-bedroom home in five years in an area with a decent school district, accumulating $50,000 in savings in eighteen years for establishing a college fund, and purchasing a minivan in ten months.

At 310, the adviser AI circuit 244 determines context information related to the goal 105. The adviser AI circuit 244 pulls the context information from suitable sources, such as news sources, databases managed by government agencies (e.g., the Bureau of Labor Statistics), databases managed by Non-Government Organizations (NGOs), and the like. The adviser AI circuit 244 can utilize web crawlers, APIs, and other suitable mechanisms for attaining the context information.

As described, the context information can be used to assign a future monetary value to the goal 105 if the future monetary value is not explicitly defined by the customer 101. For example, responsive to determining the customer 101 desires to purchase a three-bedroom home in five years in an area with a decent school district, the adviser AI circuit 244 can search for local housing in areas having a school district with an average rating of "seven" and above out of ten. The adviser AI circuit 244 uses suitable housing price models to determine a projected average price (e.g., $800,000) for three-bedroom homes in five years. The projected average price is the future monetary value associated with the goal 105 of purchasing a three-bedroom home in five years in an area with a decent school district (a school district with an average rating of "seven" and above out of ten).

At 315, the adviser AI circuit 244 gathers the account information of the customer 101, including the transaction history of the customer 101. The transaction history shows initiated and completed transactions, based on which the adviser AI circuit 244 can determine whether the customer 101 is on-track or off-track to achieve the goal 105. The adviser AI circuit 244 detects and monitors the transaction history (e.g., digital transactions initiated by the customer 101). Transactions concerning both an increase in assets (e.g., deposits, investment earnings, appreciation of assets, and the like) and decrease in assets (e.g., withdrawals, spending, losses, depreciation, and the like) are monitored.

At 320, the adviser AI circuit 244 determines a projected status based on the context information and the account information. At 325, the adviser AI circuit 244 determines a completion state indicative of whether the projected status conforms with the goal 105. In some arrangements, the adviser AI circuit 244 performs 320 and 325 periodically (e.g., daily, weekly, monthly, and the like) with respect to recent transactions as shown in the transaction history. As such, the periodicity of the analysis can be aligned with the times for which the sub-goals are defined. That is, when a time associated with a sub-goal is the present time, the adviser AI circuit 244 determines whether the current status of the customer 101 meets the corresponding sub-goal. As such, block 325 further includes determining whether the current status of the customer 101 meets the sub-goals. The current status of the customer can be based on an amount of funds held by the customer in a financial account. In other arrangements, the adviser AI circuit 244 performs 320 and 325 responsive and with respect to every new transaction. The customer 101 can set a user preference to using the input circuit 210. The user device 110 relays the user preference to the adviser AI circuit 244.

The account information includes previously known information and new account information such as but not limited to, new transactions initiated and/or processed after the previous iteration in which blocks 320 and 325 were performed. In one implementation, the AI decision simulator circuit 246 predicts future context information based on current context information using suitable models, within a timeframe defined by the desired realization time. Using the future context information and suitable models, the AI decision simulator circuit 246 can simulate future effects of the new transactions relative to the goal 105.

The adviser AI circuit 244 can determine a projected status threshold based on the future monetary value associated with the goal 105. As described, the future monetary value is explicitly defined by the customer 101 or automatically determined based on the context information. The projected status threshold can be the future monetary value, a predetermined percentage (e.g., 50%, 80%, 90%, 95%, 105%, 110%, and the like) of the future monetary value, or the like. The projected status determined at 320 conforms to the goal 105 if the projected status exceeds the projected status threshold. The projected status determined at 320 fails to conform to the goal 105 if the projected status is below the projected status threshold.

For example, returning to the example in which the goal 105 is purchasing a three-bedroom home in five years in an area with a decent school district (a school district with an average rating of "seven" and above out of ten), the future monetary value associated with this goal 105 is $800,000 in five years. The customer 101 makes a purchase for a luxury sedan one year into the five year timeframe, for $100,000. Considering future context information such as but not limited to, projected interest rate, market fluctuations, and depreciation of the luxury sedan for the next four years, the AI decision simulator circuit 246 can determine that the savings of the customer 101 four years later will be $160,000 less than the predicted savings if the purchase had not occurred. Given that the predicted savings falls below a predetermined threshold (e.g., 90% of the estimated future monetary value), the adviser AI circuit 244 determines that the projected status does not conform with this particular goal 105.

In some arrangements, the adviser AI circuit 244 can determine a level of conformity (or nonconformity) using the future monetary value associated with the goal 105 and the projected status determined at 320. The adviser AI circuit 244 can determine conformity levels based on percentages of the future monetary value. For instance, any projected status exceeding 95% of the future monetary value associated with the goal 105 is deemed to be in a high level of conformity with the goal 105. An indicator (e.g., a high score, a green light, and the like) commensurate with the level of conformity can be presented to the customer 101 in the manner described. Any projected status between 80%-95% of the future monetary value associated with the goal 105 is deemed to be in a medium level of conformity with the goal 105. An indicator (e.g., a medium score, a yellow light, and the like) commensurate with the level of conformity can be presented to the customer 101 in the manner described. Any projected status lower than 80% of the future monetary value associated with the goal 105 is deemed to be in a low level of conformity with the goal 105. An indicator (e.g., a low score, a red light, and the like) commensurate with the level of conformity can be presented to the customer 101 in the manner described.

In response to determining that the projected status conforms with the goal 105 (325:YES), the adviser AI circuit 244 can perform one or more of 330-340, in any suitable sequence or simultaneously. At 330, the adviser AI circuit 244 can process or authorize one of more initiated pending (but not completed) transactions that have been analyzed. Pending or initiated transactions can be evaluated based on the goal 105 in the manner described. Pending or initiated transactions that conform with the goal 105 can be authorized and processed. Processing and authorizing the initiated transactions can include, for example, issuing digital payment tokens.

Figure 5B:
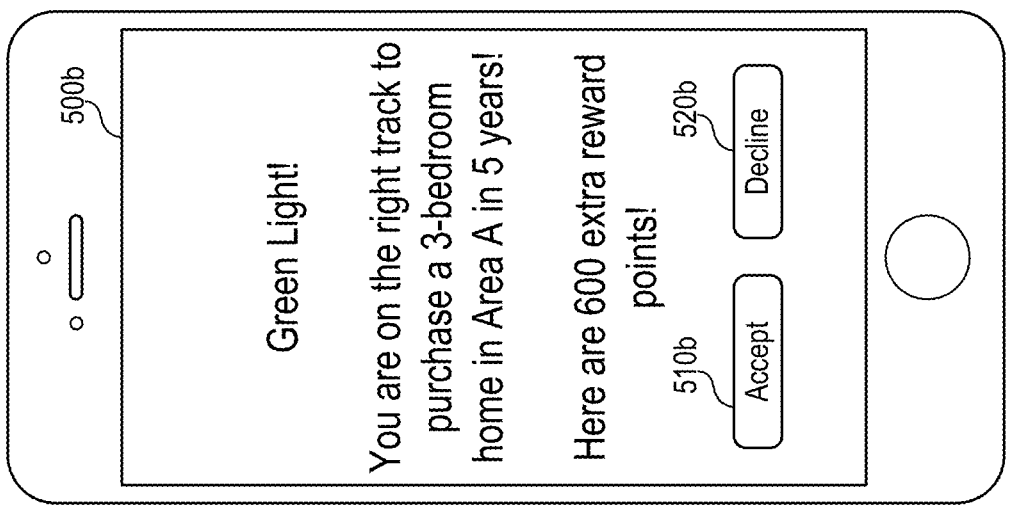
FIGS. 5A-5F are interface display diagrams illustrating interactive interfaces for providing automated advising services according to some arrangements.
Figure 5A:
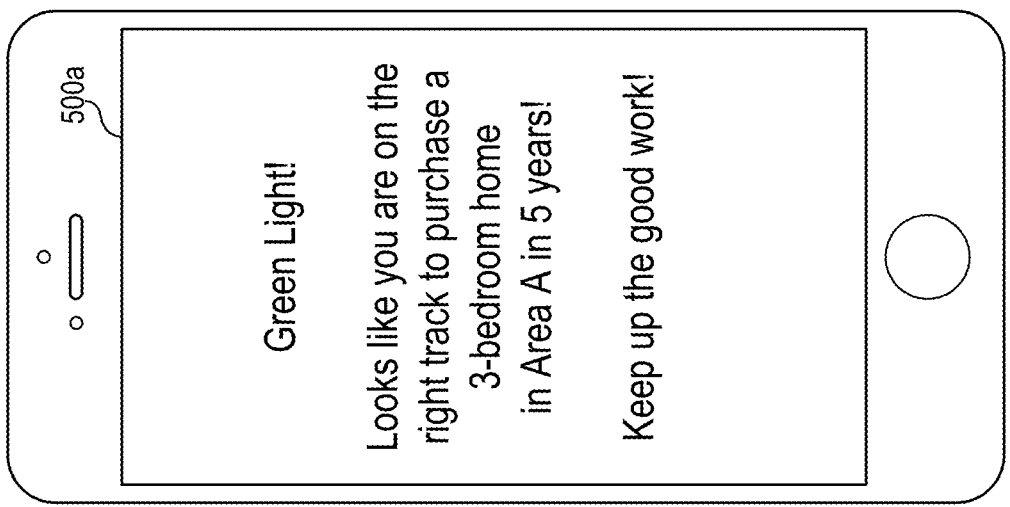

At 335, the adviser AI circuit 244 can send an encouragement message to the user device 110. The adviser circuit 222 can trigger the output circuit 212 to display the encouragement message. FIG. 5A illustrates an exemplary interface display 500a outputted by the output circuit 212 that displays the encourage message.

At 340, the adviser AI circuit 244 can offer rewards to the customer 101. The adviser AI circuit 244 can send rewards information to the user device 110. The adviser circuit 222 can trigger the output circuit 212 to display the rewards information. FIG. 5B illustrates an exemplary interface display 500b outputted by the output circuit 212 that displays the rewards information. User interactive elements 510b and 520b allow the customer 101 to accept or decline the rewards, respectively.

Figure 5E:
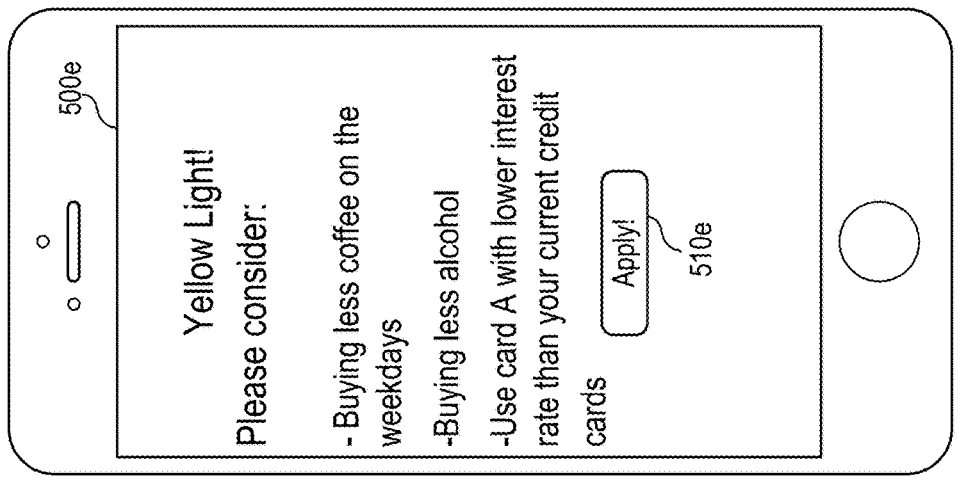
Figure 5D:
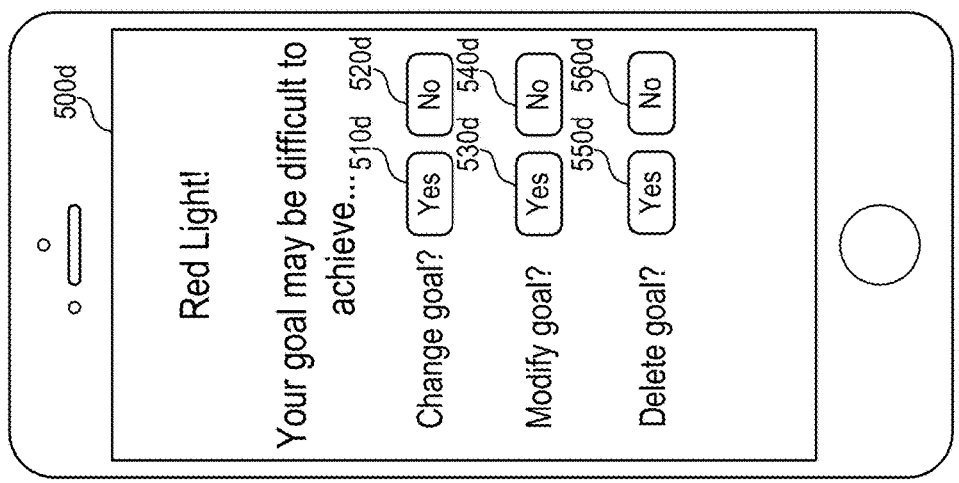
Figure 5C:
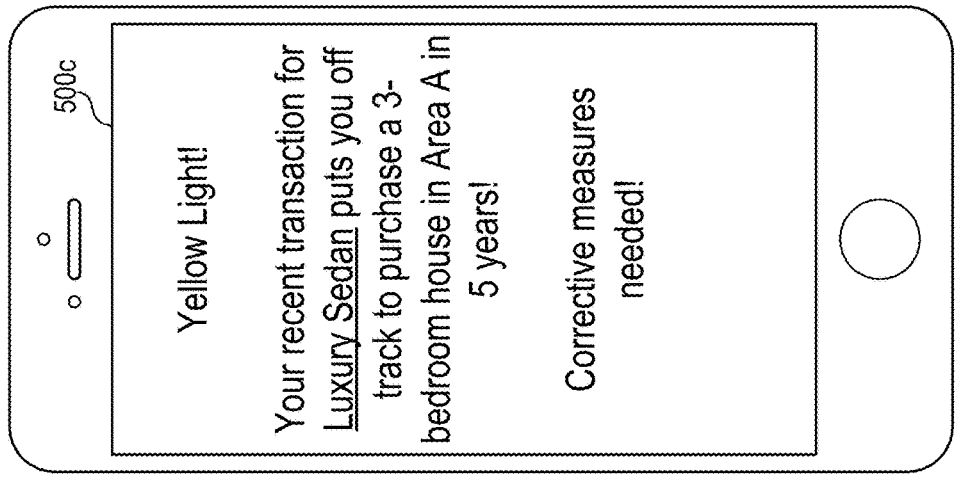

In response to determining that the projected status fails to conform with the goal 105 (325:NO), the adviser AI circuit 244 can perform one or more of 345-375, in any suitable sequence or simultaneously. At 345, the adviser AI circuit 244 can send a warning message or notification to the user device 110. The adviser circuit 222 can trigger the output circuit 212 to display the warning message or notification. FIG. 5C illustrates an exemplary interface display 500c outputted by the output circuit 212. The interface display 500c displays the warning message. Other types of notifications such as, but not limited to, Short Message Service (SMS), email, voice memo, tactile feedback, and the like can be likewise used to notify the customer 101 of the nonconformity.

At 350, the adviser AI circuit 244 can request that the customer 101 to update the goal 105. FIG. 5D illustrates an exemplary interface display 500d outputted by the output circuit 212. Through the user interactive elements 510d-560d, the interface display 500d allows the customer 101 to select, via the input circuit 210, from changing the goal 105 to a new goal, modifying the existing goal 105, and deleting the goal 105.

In some arrangements, the interface display 500d can further display recommended updates (not shown) to the goal 105. The adviser AI circuit 244 can determine the recommended update based on the future monetary value of the goal 105. For example, the adviser AI circuit 244 can lower the future monetary value of the goal 105 such that the projected status can reasonably meet the lowered future monetary value. For example, the adviser AI circuit 244 determines that the projected status of the customer 101 is saving $550,000 in five years instead of reaching the goal 105 of saving $800,000 in five years. The adviser AI circuit 244 further determines that the projected status is at a low level of conformity with the goal 105 (e.g., below 75% of the future monetary value) such that achieving the goal 105 is deemed to be difficult. The adviser AI circuit 244 can set a new goal (e.g., saving $700,000 in 5 years) that is between the projected status and the future monetary value of the original goal 105.

At 355, the adviser AI circuit 244 can recommend corrective actions to the customer 101 by sending recommendation information to the user device 110. At 360, the adviser AI circuit 244 can recommend products and/or services to the customer 101 by sending product/service information to the user device 110. The adviser circuit 222 can trigger the output circuit 212 to display the recommendation information and/or the product/service information received from the provider institution computing system 230. FIG. 5E illustrates an exemplary interface display 500e outputted by the output circuit 212. The interface display 500e displays recommendations (e.g., "buying less coffee on the weekdays" and "buying less alcohol") and product/service information (e.g., "use card A with less interest than your current credit cards"). Other types of recommendations include, but are not limited to setting up recurring periodic transfers of a designated amount from a checking account to a savings account to remove some disposable income can be likewise implemented. The designated amount can be determined based on the future monetary value of the goal 105, the projected status, and/or a difference thereof. In such scenarios, an interface display similar to the interface display 500e can show a user interactive element such that, when selected, causes the recurring transfers to be automatically set up without further user input. Responsive to determining that user interactive element 510e is selected, the adviser circuit 222 can trigger the output circuit 212 to display forms to apply for the recommended product/service (e.g., "card A"). One of ordinary skill in the art can appreciate other products and services, such as but not limited to, restructuring a debt, applying for home equity, and the like can be initiated via a user interface, such as but not limited to, the interface display 500e to provide end-to-end fulfillment to the customer 101.

At 365, the adviser AI circuit 244 can block or otherwise prevent one or more initiated (but not completed) transactions that have been analyzed. Pending or initiated transactions can be evaluated based on the goal 105 in the manner described. Pending or initiated transactions that fail to conform with the goal 105 can be blocked or otherwise prevented.

Figure 5F:
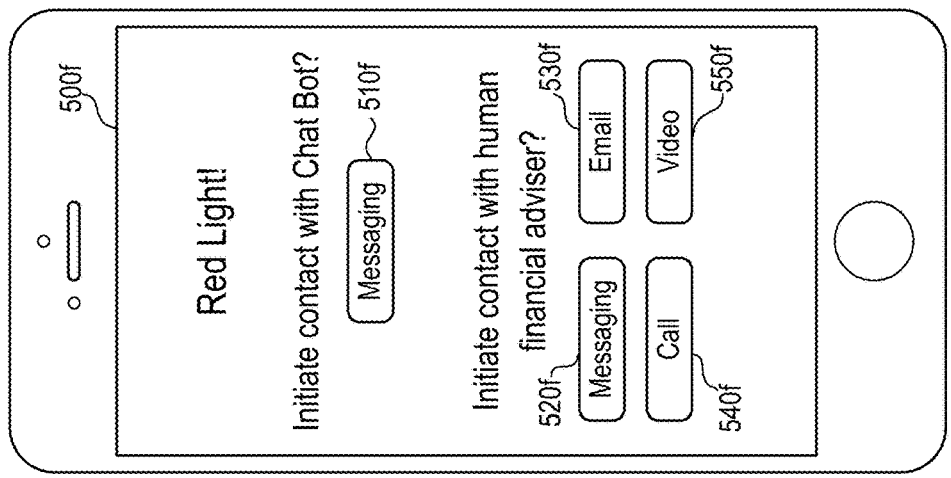

At 370, the adviser AI circuit 244 can initiate a teleconference or video conference with live support (e.g., the human advisor 144). At 375, the adviser AI circuit 244 can initiate messaging with the chat bot 142 or the live support. In particular, the adviser AI circuit 244 can send a request to the adviser circuit 222, requesting that the output circuit 212 display user interfaces that allow the customer 101 to contact the chat bot 142 and/or the human advisor 144 via messaging (e.g., instant messaging, Short Message Service (SMS), and the like), emails, voice call, video call, and the like. FIG. 5F illustrates an exemplary interface display 500f outputted by the output circuit 212. The interface display 500f displays a user interactive element 510f that, in response to being selected, triggers the user device 110 to initiate instant messaging or SMS messaging with the chat bot 142. The interface display 500f displays user interactive elements 520f-550f that, in response to being selected, trigger the user device 110 to initiate messaging, email, voice call, and video call, respectively, with the human advisor 144.

As shown in FIGS. 5A-5F, each of the interfaces 500a-500f can display an indicator (e.g., "green light," "yellow light," and "red light") corresponding to a level of conformity to the goal 105 as described. In some arrangements, the corrective action (e.g., 330-375) can be selected based on the level of conformity. For example, responsive to determining a high level of conformity (e.g., "green light"), the adviser AI circuit 244 can select processing one or more initiated transactions (e.g., 330), sending an encouragement message (e.g., 335), and offering rewards (e.g., 340). Responsive to determining a medium level of conformity (e.g., "yellow light"), the adviser AI circuit 244 can select sending a warning message to the user device 110 (e.g., 345), sending recommended actions (e.g., 355), and sending recommended products/services (e.g., 360). Responsive to determining a low level of conformity (e.g., "red light"), the adviser AI circuit 244 can select updating the goal 105 (e.g., 350), blocking one or more initiated transactions (e.g., 365), and initiating communications with the chat bot 142 and/or the human adviser 144 (e.g., 370 and/or 375).

Figure 6B:
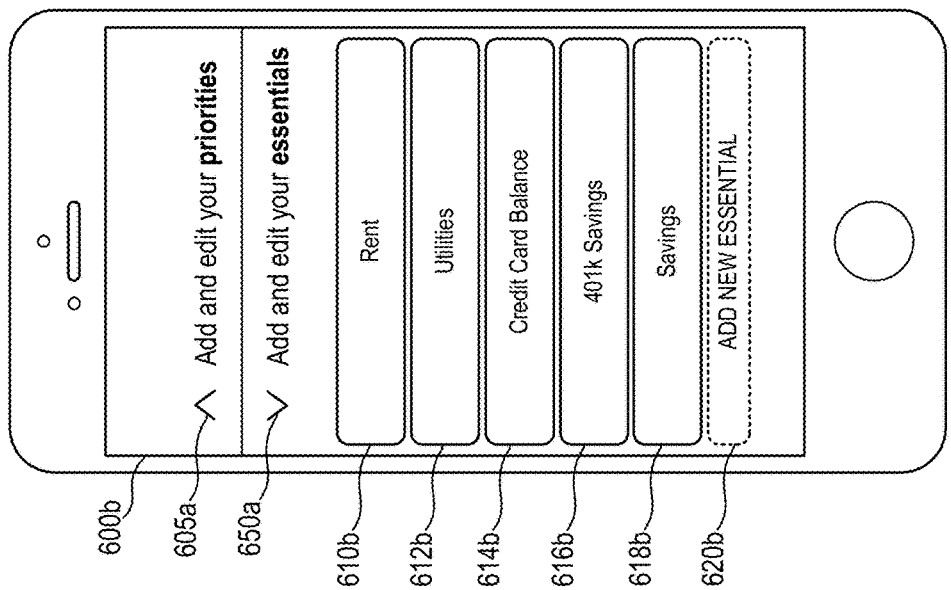
FIGS. 6A-6B are interface display diagrams illustrating interactive interfaces for displaying a customer's goals according to some arrangements.
Figure 6A:
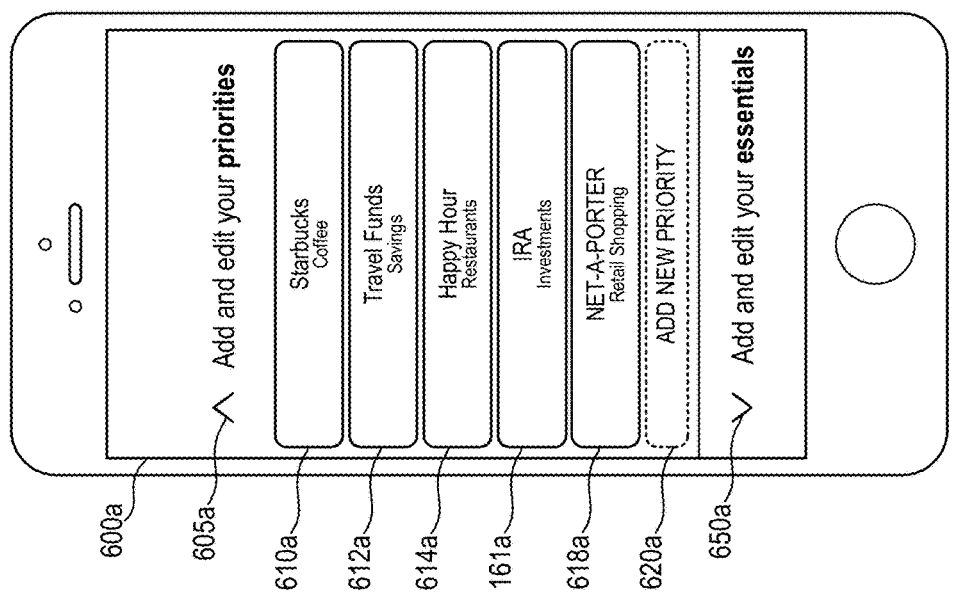

In some arrangements, the adviser circuit 222 can present user interfaces (e.g., configured as dash boards) to allow the customer 101 to change, delete, add, and prioritize goals. FIGS. 6A-6B are interface display diagrams illustrating interactive interfaces 600a and 600b for displaying goals 610a-618a and 610b-618b of the customer 101 (FIG. 1) according to some arrangements. Referring to FIGS. 1-6B, the goals 610a-618a and 610b-618b are classified into two categories, priorities 605a (non-essentials) and essentials 650a. The goals 610a-618a in the essentials 650a category are prioritized before the goals 610a-618a in the priorities 605a category. Within each particular category, goals (e.g., the goal 610a) that are displayed higher have priority over goals (e.g., the goal 630a) that are displayed lower. This allows the customer 101 to visually examine the priority of his or her goals. Allocation of the resources of the customer 101 also prioritizes the goals with higher priority.

The goals 610a-618a are displayed responsive to the customer 101 selecting the user interactive element corresponding to the priorities 605a. The goals 610b-618b are displayed responsive to the customer 101 selecting the user interactive element corresponding to the essentials 650a. The categories can be defined (e.g., added, deleted, modified, or prioritized) manually by the customer 101 via the input circuit 210 in one arrangement. The adviser AI circuit 244 can automatically define the categories based on classifications of spending as determined from the transaction history. By selecting one of the user interactive elements corresponding to the goals 610a-618a and 610b-618b the customer 101 can modify or delete the corresponding goal. By selecting one of the user interactive elements corresponding to adding a new priority 620a and adding a new essential 620b, the customer 101 can add a new goal in priorities 605a and essentials 650a, respectively.

The goal 105 of the customer 101 can change over time. In some arrangements, the customer 101 can explicitly modify the goal 105 using the input circuit 210. The customer 101 can select a user interactive element corresponding to one of the goals 610a-618a and 610b-618b, and proceed with modification using additional user interactive elements not shown. As such, additional user input explicitly modifying the goal 105 can be sent to the adviser AI circuit 246, which can then update the goal database 248.

In some arrangements, the adviser AI circuit 246 can determine modifications or changes to the context of information related to the goal 105. The modifications or changes to the context can include but are not limited to, change in housing market (e.g., an unpredictable market crash), change in interest rate, any deviation from the model based on which the future monetary value of the goal 105 is calculated, and the like. The adviser AI circuit 246 can determine the impact of such modifications or changes to the goal 105, and especially to the future monetary value. Likewise, changes to the account information of the customer 101, such as but not limited to, sudden increase in earnings due to a raise or decrease in earnings due to being terminated, can also impact the ability of the customer 101 to afford certain goods/services. As such, the evaluation at 325 can be based on the modified future monetary value and the modified ability to pay. In some arrangements in which the modifications and changes to the context information and/or the account information make a goal easier or harder to achieve, the adviser AI circuit 246 can recommend modifications to the goal 105 taking into account such modifications.

For example, due to an unforeseen crash in the housing market, a three-bedroom home in five years in an area with a decent school district (a school district with an average rating of "seven" and above out of ten) is projected to have a modified future monetary value of $500,000 instead of $800,000 (the initial future monetary value). The customer 101 also unexpectedly earned $50,000 for trading stocks. In this example, the adviser AI circuit 246 can recommend the customer 101 to change the goal 105 from buying a three-bedroom home in five years in an area with a decent school district (a school district with an average rating of "seven" and above out of ten) to buying a four-bedroom home in four years in the same area.

In another example, due to an unforeseen demand in housing, a three-bedroom home in five years in an area with a decent school district (a school district with an average rating of "seven" and above out of ten) is projected to have a modified future monetary value of $1,200,000 instead of $800,000 (the initial future monetary value). In this example, the adviser AI circuit 246 can recommend the customer 101 to change the goal 105 from buying a three-bedroom home in five years in an area with a decent school district (a school district with an average rating of "seven" and above out of ten) to buying a two-bedroom home in six years in the same area, given that it is no longer feasible for the customer 101 to save for sufficient down payment for the original goal.

In another example, the adviser AI circuit 246 can be operatively coupled to real estate listing databases configured to and determine that a home that fits the goal 105 of the customer 101 is going on a short-sale. If the home meets the current status of the customer 101, instead of determining the projected status, the adviser AI circuit 246 only analyzes the current status of the customer (e.g., the current balance of the customer's saving account allocated for purchasing a home). The adviser AI circuit 246 can send the recommendation of purchasing this home to the user device 110, to be displayed via the output circuit 212.

In some arrangements, the adviser AI circuit 246 can determine a life event in the life of the customer 101 based on the transaction history, and automatically update the goal 105 according to the life event. In one example in which an initial goal is defined as going on a snowboarding trip in one week, the adviser AI circuit 246 determines that the customer 101 paid a podiatrist and bought crutches online by monitoring transactions made by the customer 101. The adviser AI circuit 246 can automatically update the initial goal by extending the desired realization time by two months or deleting the initial goal. In other arrangements, the adviser AI circuit 246 can send such recommendation to the user device 110 to be displayed to the customer 101 via the output circuit 212, to obtain authorization from the customer 101 before updating the original goal.

In some examples, the arrangements disclosed herein can be gamified. For example, the customer 101 can pass through various levels or be awarded trophies, badges, or icons for reaching certain milestones (e.g., retirement savings of $50,000, $100,000, $500,000, $1,000,000) or achieving certain goals (e.g., purchase of a new car or house) of the customer 101. In some embodiments, achievements of the customer can be publicized (e.g., to social media friends or followers) without revealing details of the achievement that the customer 101 wishes to remain private (e.g., a specific amount of money required for the achievement).

In some embodiments, the arrangements disclosed herein can be implemented as a game (playable on the user device 110) that can inform the customer 101 of projected, virtual, in-game consequences of various actual or virtual decisions. The in-game consequences relate to whether the customer 101 is on track to meet the goals stored in the goal database 248 similar to described herein. The customer 101 can interact with the game via the input circuit 210 and the output circuit 212. The game can be provided by the adviser AI circuit 244 and the decision simulator circuit 246 as an application, a browser-based game, and the like. The decision simulator circuit 246 in this case takes virtual decisions (those that occur in-game only) in addition to actual decisions as input to determine the projected status.

After an initial setup/registration, the game can obtain decisions that the customer 101 has made in the past. For example, during a registration process, the customer 101 can provide account credentials (e.g., username, password, biometrics, account identifiers, and the like) via the input circuit 210. The adviser circuit 222 can configure the network interface 208 to send the account credentials to the provider institution computing system 230. Using the account credentials, the adviser AI circuit 244 obtains relevant data from the account database 240, the mobile wallet database 242, and another suitable database in the manner described. The actual decisions reflected by information included in the databases 240 and 242 can be used in connection with other selectable virtual decisions presented through the course of the game determine whether the customer 101 is on-track to meet the goals stored in the goal database 248. The customer 101 can input goals via the input circuit 210. In one example, the interface 400 can be likewise used to obtain customer input.

Accordingly, the gamification of the arrangements described herein can relate to a virtual simulation of the life of the customer 101. The game processes user inputs that relate to in-game virtual decisions as well as previous/current decisions in real-life to determine a virtual status (instead of an actual status) of the customer 101 in the future. As described, the actual decisions of the customer 101 can be determined through monitoring account information or transaction histories. Both real-life and virtual decisions can impact the virtual status as the customer 101 progresses through the game. This allows the customer 101 to sample how actual and virtual decisions deviate or conform to the defined goal.

In particular, the starting point of the game corresponds to a current status of the customer 101. The current status can be determined by importing account statements and transaction history from the databases 240 and 242, accepting user input relative to the current status of the customer 101, and importing such information from third-party applications such as but are not limited to social media applications. Customer information in all aspects can be updated dynamically by updating the information from the databases 240 and 242 or by receiving relevant user input.

The game can give or otherwise allow the customer 101 to select/manipulate virtual life events that are embodied in suitable displayable components, such as cards or other suitable graphical representations. The cards are presented to the customer 101 dynamically and intelligently based on information, especially based on account information of the customer 101. In one example, if the customer 101 is already paying for monthly mortgage payments, the game does not issue a card corresponding to "purchasing a house." Instead, the game can present a card corresponding to "fixing the house." The customer 101 can select cards that correspond to virtual life events to enable virtual decisions.

The game can likewise provide notifications, messages, warnings, goal updates, recommendations, blocking/authorizing transactions, communications, and the like in the manner described. In some examples, the interfaces 500*a*-500*e* can be likewise used as game output.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
   determining, by an artificial intelligence circuit of a provider institution, a goal of a customer of the provider institution;
   determining, by the artificial intelligence circuit, context information related to the goal;
   generating, by the artificial intelligence circuit, a first set of sub-goals for the goal of the customer, the first set of sub-goals defining a first group of steps required to be met by the customer to reach the goal;
   determining, by the artificial intelligence circuit, a current status of the customer relating to the first set of sub-goals and the goal;
   determining, by the artificial intelligence circuit, whether the current status of the customer meets any of the first set of sub-goals;
   determining, by the artificial intelligence circuit, a projected status of the customer indicating whether the customer is projected to meet the goal; and
   generating, by the artificial intelligence circuit, a second set of sub-goals for the goal of the customer corresponding to a first change in the context information, the second set of sub-goals being different than the first set of sub-goals;
   wherein the goal remains unchanged upon generating the second set of sub-goals.

2. The method of claim 1, wherein determining whether the customer is projected to meet the goal comprises:
   determining a projected status threshold based on the goal and the context information; and
   in response to determining that the projected status is below the projected status threshold, determining, by the artificial intelligence circuit, whether the projected status of the customer meets the goal.

3. The method of claim 1, wherein determining whether the customer is projected to meet the goal comprises:
   simulating, with an artificial intelligence decision simulator, a future effect of a plurality of digital transactions, the simulating comprising;
      querying one or more databases for account information related to the customer; and
      querying a transaction history of the customer; and
   determining that the future effect of the plurality of digital transactions will cause the customer to not meet the goal.

4. The method of claim 3, further comprising at least one of:
   in response to determining that the customer will not meet the goal, sending, by the artificial intelligence circuit to a user device, at least one recommended action to be displayed to the customer; and
   in response to determining that the customer will not meet the goal, sending, by the artificial intelligence circuit to the user device, at least one recommended update for the goal.

5. The method of claim 1, wherein determining the projected status of the customer comprises at least one of:
   querying a local database for account information related to the customer; and
   querying a remote database associated with another artificial intelligence circuit for the account information related to the customer, wherein the account information comprises information about at least income, saving, debt, mortgage, and transaction history.

6. The method of claim 1, wherein determining the projected status of the customer comprises;
   detecting and monitoring a plurality of digital transactions initiated by the customer, the plurality of digital transactions comprising one or both of an increase in assets of the customer and a decrease in the assets of the customer.

7. The method of claim 1, further comprising:
   determining, by the artificial intelligence circuit, a second change to the context information related to the goal; and
   generating, by the artificial intelligence circuit, a third set of sub-goals for the goal of the customer corresponding to the second change in the context information, the third set of sub-goals being different than the first set of sub-goals and the second set of sub-goals.

8. An artificial intelligence circuit of a provider institution comprising:
   a processing circuit having a processor and a memory, wherein the processing circuit is configured to implement an adviser artificial intelligence (AI) circuit configured to:
   determine a goal of a customer of the provider institution;
   determine context information related to the goal;
   generate a first set of sub-goals for the goal of the customer, the first set of sub-goals defining a first group of steps required to be met by the customer to reach the goal;
   determine a current status of the customer relating to the first set of sub-goals and the goal;
   determine whether the current status of the customer meets any of the first set of sub-goals;
   determine a projected status of the customer indicating whether the customer is projected to meet the goal; and
   generate a second set of sub-goals for the goal of the customer corresponding to a first change in the context information, the second set of sub-goals being different than the first set of sub-goals;
   wherein the goal remains unchanged upon generating the second set of sub-goals.

9. The artificial intelligence circuit of claim 8, wherein determining whether the customer is projected to meet the goal comprises:
   determining a projected status threshold based on the goal and the context information; and
   in response to determining that the projected status is below the projected status threshold, determining, by the artificial intelligence circuit, whether the projected status of the customer meets the goal.

10. The artificial intelligence circuit of claim 8, wherein determining whether the customer is projected to meet the goal comprises:
    simulating, with an artificial intelligence decision simulator, a future effect of a plurality of digital transactions, the simulating comprising;
       querying one or more databases for account information related to the customer; and
       querying a transaction history of the customer; and
    determining that the future effect of the plurality of digital transactions will cause the customer to not meet the goal.

11. The artificial intelligence circuit of claim 10, further comprising at least one of:
    in response to determining that the customer will not meet the goal, sending, by the artificial intelligence circuit to a user device, at least one recommended action to be displayed to the customer; and
    in response to determining that the customer will not meet the goal, sending, by the artificial intelligence circuit to the user device, at least one recommended update for the goal.

12. The artificial intelligence circuit of claim 8, wherein determining the projected status of the customer comprises at least one of:
    querying a local database for account information related to the customer; and
    querying a remote database associated with another artificial intelligence circuit for the account information related to the customer, wherein the account information comprises information about at least income, saving, debt, mortgage, and transaction history.

13. The artificial intelligence circuit of claim 8, wherein determining the projected status of the customer comprises;
    detecting and monitoring a plurality of digital transactions initiated by the customer, the plurality of digital transactions comprising one or both of an increase in assets of the customer and a decrease in the assets of the customer.

14. The artificial intelligence circuit of claim 8, further comprising:
    determining, by the artificial intelligence circuit, a second change to the context information related to the goal; and
    generating, by the artificial intelligence circuit, a third set of sub-goals for the goal of the customer corresponding to the second change in the context information, the third set of sub-goals being different than the first set of sub-goals and the second set of sub-goals.

15. A non-transitory computer-readable medium having processor-readable instructions stored thereon such that, when executed by a processor, the instructions cause the processor to:
   determine a goal of a customer;
   determine context information related to the goal;
   generate a first set of sub-goals for the goal of the customer, the first set of sub-goals defining a first group of steps required to be met by the customer to reach the goal;
   determine a current status of the customer relating to the first set of sub-goals and the goal;
   determine whether the current status of the customer meets any of the first set of sub-goals;
   determine a projected status of the customer indicating whether the customer is projected to meet the goal; and
   generate a second set of sub-goals for the goal of the customer corresponding to a first change in the context information, the second set of sub-goals being different than the first set of sub-goals;
   wherein the goal remains unchanged upon generating the second set of sub-goals.

16. The non-transitory computer-readable medium of claim 15, wherein determining whether the customer is projected to meet the goal comprises:
   determining a projected status threshold based on the goal and the context information; and
   in response to determining that the projected status is below the projected status threshold, determining whether the projected status of the customer meets the goal.

17. The non-transitory computer-readable medium of claim 15, wherein determining whether the customer is projected to meet the goal comprises:
   simulating, with an artificial intelligence decision simulator, a future effect of a plurality of digital transactions, the simulating comprising;
      querying one or more databases for account information related to the customer; and
      querying a transaction history of the customer; and
   determining that the future effect of the plurality of digital transactions will cause the customer to not meet the goal.

18. The non-transitory computer-readable medium of claim 17, further comprising at least one of:
   in response to determining that the customer will not meet the goal, sending, to a user device, at least one recommended action to be displayed to the customer; and
   in response to determining that the customer will not meet the goal, sending, to the user device, at least one recommended update for the goal.

19. The non-transitory computer-readable medium of claim 15, wherein determining the projected status of the customer comprises at least one of:
   querying a local database for account information related to the customer; and
   querying a remote database for the account information related to the customer, wherein the account information comprises information about at least income, saving, debt, mortgage, and transaction history.

20. The non-transitory computer-readable medium of claim 15, further comprising:
   determining a second change to the context information related to the goal; and
   generating a third set of sub-goals for the goal of the customer corresponding to the second change in the context information, the third set of sub-goals being different than the first set of sub-goals and the second set of sub-goals.

* * * * *